310-369 SR

7/8/86 XR 4,599,626

United States Patent [19]

Rich

[11] Patent Number: 4,599,626

[45] Date of Patent: Jul. 8, 1986

[54] INK DROP EJECTING HEAD

[75] Inventor: Leonard G. Rich, West Hartford, Conn.

[73] Assignee: Metromedia, Inc., Secaucus, N.J.

[21] Appl. No.: 637,163

[22] Filed: Aug. 2, 1984

[51] Int. Cl.[4] .............................................. G01D 15/18

[52] U.S. Cl. ................................ 346/140 R; 310/369; 310/328

[58] Field of Search .................. 346/140, 75; 310/369, 310/328

[56] References Cited

U.S. PATENT DOCUMENTS

| | | | |
|---|---|---|---|
| 1,941,001 | 12/1933 | Hansell | 346/75 |
| 3,657,599 | 4/1972 | Kashio | 346/75 X |
| 3,679,132 | 7/1972 | Uehe | 239/102 X |
| 3,683,212 | 8/1972 | Zoltan | 346/140 X |
| 3,776,461 | 12/1973 | Kashio | 346/140 X |
| 3,832,579 | 8/1974 | Arndt | 346/140 X |
| 4,015,272 | 3/1977 | Yamamori | 346/140 |
| 4,122,457 | 10/1978 | Erikson | 346/75 |
| 4,245,227 | 1/1981 | Krause | 346/75 |
| 4,308,546 | 12/1981 | Halasz | 346/140 |
| 4,317,124 | 2/1982 | Shirato | 346/140 |
| 4,323,908 | 4/1982 | Lee | 346/140 |
| 4,375,066 | 2/1983 | Herd | 346/140 |
| 4,435,721 | 3/1984 | Tsuzuki | 346/140 |
| 4,499,479 | 2/1985 | Lee | 346/140 |

OTHER PUBLICATIONS

Meier, J. H.; Ink Jet Head, IBM Technical Disclosure Bulletin, vol. 16, No. 6, Nov. 1973.

*Primary Examiner*—Joseph W. Hartary
*Attorney, Agent, or Firm*—McCormick, Paulding & Huber

[57] ABSTRACT

An ink jet head for ejecting drops of ink in an ink jet printing system is designed for easy disassembly for cleaning and can readily be made in different sizes including one capable of ejecting relatively large volume drops of heavily pigmented and relatively viscous ink as may be used for printing outdoor billboards or other large scale graphics. The head also includes a means for reducing the size of or entirely eliminating any blob of ink which may form over the ejection port at low actuating frequencies, thereby making the velocity and other characteristics of the ejected drops more uniform over the full range of operating frequencies.

4 Claims, 11 Drawing Figures

INK DROP EJECTING HEAD

BACKGROUND OF THE INVENTION

This invention relates to ink jet printing systems, and deals more particularly with an improved head for use in such a system for causing the ejection of ink drops.

The ink drop ejecting head of this invention may be used in various types of ink jet printing systems, but it is particularly well-suited for drop-on-demand systems, and is also particularly well-suited for use in systems for producing large scale graphics, such as billboards, intended for outdoor or other rugged service, where it is desired to have the head eject drops of relatively large volume in comparison to the volume of drops ejected by more conventional heads and where it is desired to have the ink be one which is relatively heavily pigmented and relatively viscous in comparison to inks more conventionally used with ink jet printing heads, the ink therefore having characteristics which might perhaps suggest its being referred to as a paint rather than an ink.

One object of the invention is therefore to provide an ink drop ejecting head of relatively large size capable of ejecting relatively large volume drops of heavily pigmented relatively viscous ink over an acceptable frequency range, say of 0 to 1 kilohertz or more, which ink drop ejecting head may be readily disassembled for repair and cleaning, and which ejecting head also has a nozzle forming the ejection port which nozzle is readily removable from the remainder of the head for cleaning or replacement.

In drop-on-demand ink jet printing systems the frequency of actuation of an ejecting head varies over a wide range since at different times in the scanning of the head relative to the ink drop receiving surface the head may be expected to print only a very few drops or a maximum number of drops or any number of drops therebetween. To achieve proper supply of ink to the ink chamber of the head a positive static pressure is often applied to the ink supply. As a result of this, and sometimes for other reasons in the case of ejection heads which are not supplied with ink at a positive static pressure, when the head is actuated at low frequencies, that is when the period between successive actuations is relatively long, ink will tend to ooze from the ejection port and form an external blob covering the port. On the other hand, at higher actuation frequencies no blob may appear. When a blob is covering the ejection port upon the actuation of the head the ejected ink drop has to shoot through the blob to reach the receiving surface. This has the effect of reducing the velocity of the ejected drop in comparison to the velocity it would have if no blob were present. Also, in shooting through a blob an ejected drop may have its shape varied in comparison to the shape it would have if no blob were present and also small satellite drops may be formed which may reach the receiving surface and have an undesired effect. Preferably, the ejected drops should have a uniform size, shape and velocity regardless of the actuation frequency of the head, but the fact that a blob of ink may cover the ejection port at some actuation frequencies and not at others, or may be of different sizes depending on the actuating frequency militates against the achievement of such uniformity of drop characteristics independent of actuating frequency.

A further object of the invention is therefore to provide an ink drop ejecting head including a means for eliminating or reducing the size of any ink blob which may tend to form externally over the ejection port, thereby through the elimination or reduction of such blob achieving more uniform ejected drop characteristics over the full range of head actuating frequencies.

Other objects and advantages of the invention will be apparent from the following description of preferred embodiments and from the accompanying drawings.

SUMMARY OF THE INVENTION

The invention relates in an ink drop ejecting head comprised of a tubular section of piezoelectric material having open ends closed by forward and rear closure members to define an ink chamber, a nozzle means associated with the forward closure member, and an inlet means associated with the rear closure member, with the closure members each being releasably connected with the tubular section of piezoelectric material to allow such parts to be readily disassembled and reassembled for cleaning. The nozzle means also includes a nozzle member separate from the forward closure member which is threadably connected with the forward closure member to allow it to be readily removed from the remainder of the head for cleaning or replacement. Further, an electrical contact is provided with the internal surface of the piezoelectric tubular section by means of a spring carried by one of the closure members, the spring in the assembled condition of the head is held in a deflected condition by the interior surface of the tubular section so as to make good electrical contact with that surface, but the spring nevertheless is freely slidable relative to the interior surface of the tubular section to facilitate the disassembly and reassembly of the head parts.

The invention also resides in the ejecting head for an ink jet printing system including a means for eliminating or reducing the size of an ink blob which may form over the ejection port. More specifically, the invention resides in such blob reducing or eliminating means being either a means defining a particular shape for the nozzle which causes any blob which forms to have a major portion of its body collect to one side of the ejection port so that the portion of the blob which does cover the port is kept to a relatively thin dimension. Also in keeping with the invention the blob reducing or eliminating means may be a means forming one or more sucker ports located closely adjacent to the ejection port and associated with a vacuum drain so as to suck away the material of any blob which may tend to form. The blob reducing or eliminating means may also in keeping with the invention consist of a capillary means, such as a pair of closely spaced blades, extending into the region which a blob might occupy adjacent to the ejection port so as to draw away the material of an incipient blob by capillary action.

DETAILED DESCRIPTION OF THE PREFERRED EMBODIMENTS

Figure 1:
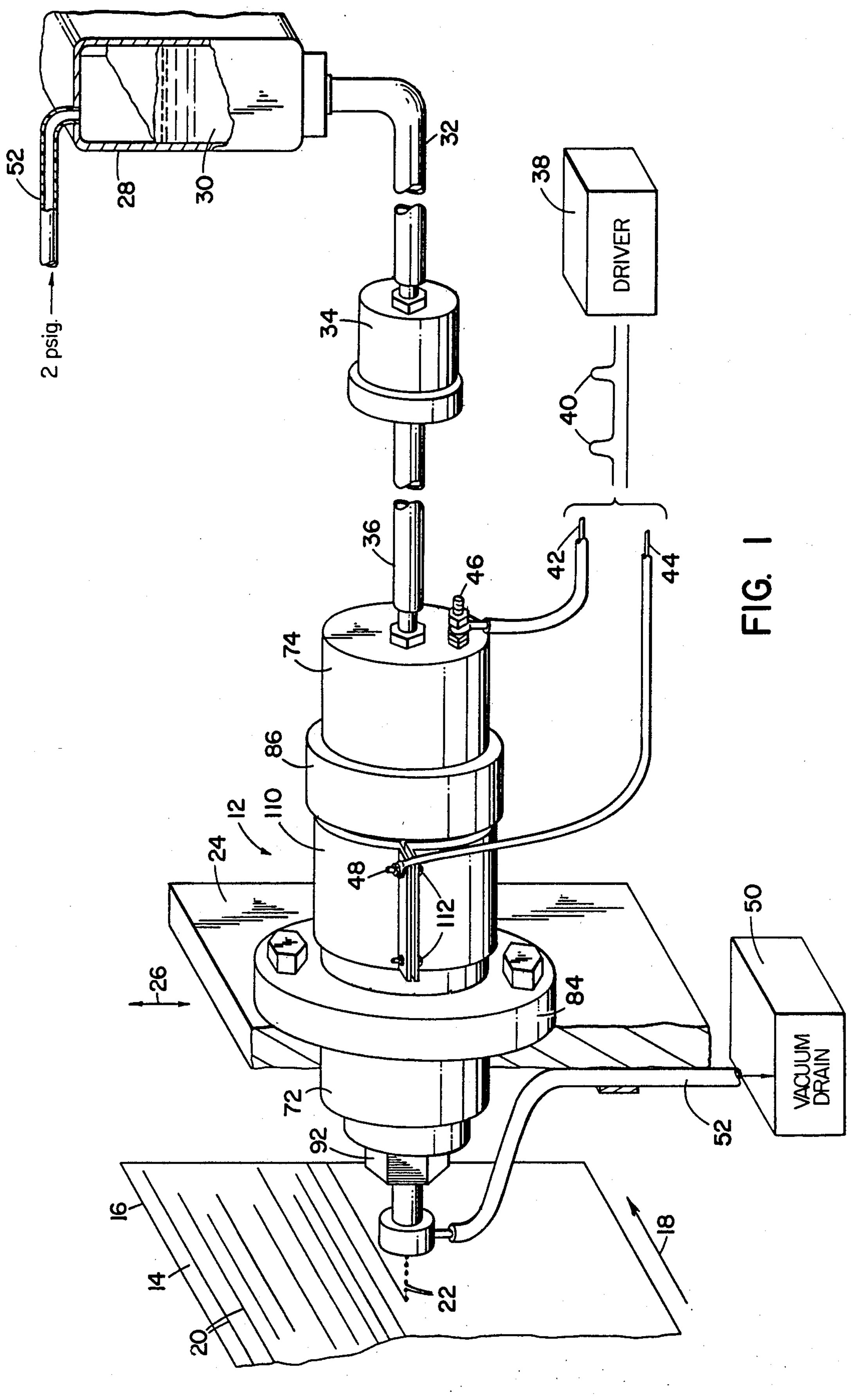
FIG. 1 is a perspective view of an ink drop ejecting head embodying the invention.

FIG. 1 shows that portion of an ink jet printing system associated with one printing head indicated generally at 12. The head 12 may be the only head of the printing system, but generally a system will include a number of such heads. For example, in one system there may be twelve such heads with three being used with magenta colored ink, three being used with cyan colored ink, three being used with yellow colored ink, and three being used with black ink. Preferably in such a system all of the heads are similar to the one shown at 12 in FIG. 1. In any event, the portion of the system shown in FIG. 1 in addition to the head 12 includes a receiving surface 14 formed on a sheet of material 16 which is moved repetitively in the direction of the arrow 18 past the ejection head 12 to cause the ejection head to scan repetitive horizontal lines 20, 20 on the surface 14, with the head being moved slightly downwardly relative to the receiving surface between successive scans so that the lines 20, 20 are slightly vertically spaced from one another. In the course of each scan the head 12 is actuated to eject drops 22, 22 of ink which strike and print the receiving surface along the scan line as is well known in the ink jet printing art. The illustrated head 12 is one which is operated in a drop-on-demand fashion which means it is actuated only when a drop is desired and it is intended that each ejected drop reach and print the receiving surface. This means that the frequency of actuation, or the period between successive drops, necessarily varies widely so that, as required by the graphic being printed, the density or closeness of the drops relative to one another on the scan line will vary.

The size of the ink drop ejecting head may vary to suit the particular ink jet printing system in which it is used, but as will be evident hereinafter its construction is such that it may readily be made of a relatively large size and is further such that it can effectively be used with a relatively heavily pigmented and relatively viscous ink, and it can be sized to eject relatively large volume drops, thereby adapting it to use in printing relatively large scale graphics, in which case the sheet 16 providing the receiving surface 14 may be either part of or the whole of a relatively large sign such as a billboard used for outside advertising.

The illustrated ejecting head 12 of FIG. 1 is mounted to a supporting member 24 movable in the vertical direction, as indicated by the arrow 26, to achieve the vertical spacing between successive scan lines 20, 20. Ink is supplied to the head from a supply container 28 containing a quantity of ink 30. The ink is taken from the bottom of the container 28 by a flexible plastic tube 32 connected to the input of a filter 34. The output of the filter is in turn connected to the inlet port of the head 12 by another flexible tube 36. Both of the tubes 32 and 36 may be made of a plastic material such as a polyvinylchloride sold under the trademark "TYGON". Electrical signals for actuating the head 12 are provided by a driver 38 producing an electrical output having voltage pulses 40, 40 appearing across conductors 42 and 44 connected to electrical terminals 46 and 48 of the head. As explained in more detail hereinafter the ejecting head 12 of FIG. 1 also includes a means associated with its forward end for reducing the size of or eliminating any ink blob which may form over the ejection port. Included in this means is a vacuum drain 50 connected with the forward end of the head 12 through a flexible tube 52 with the vacuum drain 50 creating a vacuum in the tube 52 for drawing or sucking off the material of a blob. Although it may not be necessary in all cases, the ink supplied to the ejecting head 12 is preferably supplied at a slight static pressure. For this purpose therefore, as shown in FIG. 1, the supply container 28 has associated with it a pressure line 54 connected to a source, not shown, of pressurized air. The pressure in the line 52 may vary but in the illustrated case is for example shown to be 2 p.s.i.g.

Figure 3:
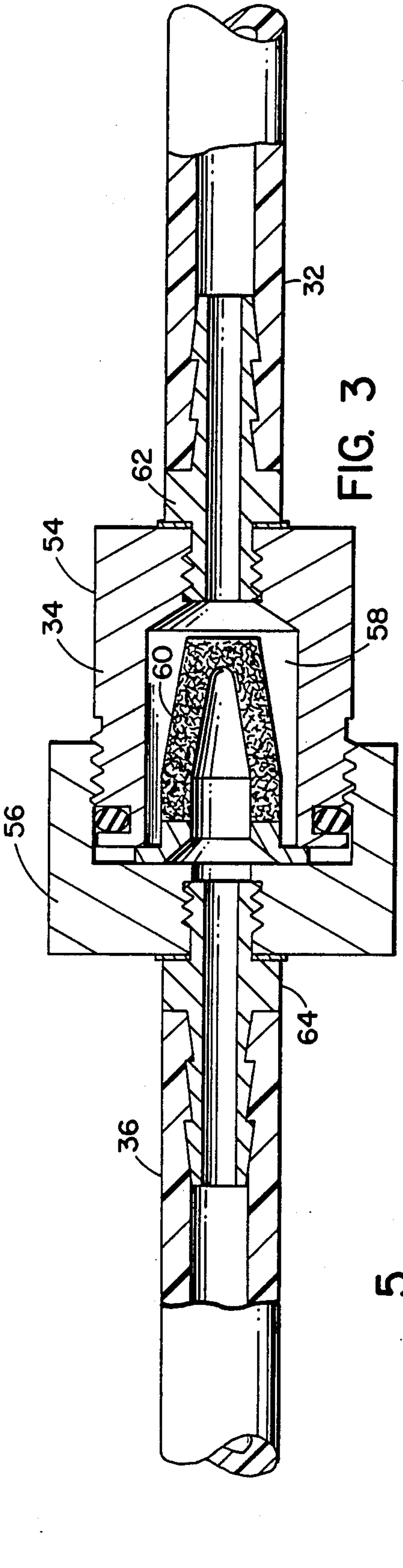
FIG. 3 is a longitudinal vertical sectional view taken through the filter of FIG. 1.

The construction of the filter 34 may also vary, but in the illustrated case, as shown in FIG. 3, it consists of a body including two threadably connected parts 54 and 56 defining a chamber 58 receiving a filter element 60. The filter element 60 is thimble shaped and made of porous metal, it being of a type commonly used as a fuel filter for gasoline engines. The rear part 54 of the filter body has a barbed hose connector 62 threaded into it for receiving the associated end of the tube 32 and the part 56 likewise has threaded into it another hose connector 64 for receiving the associated end of the tube 36.

Figure 2:
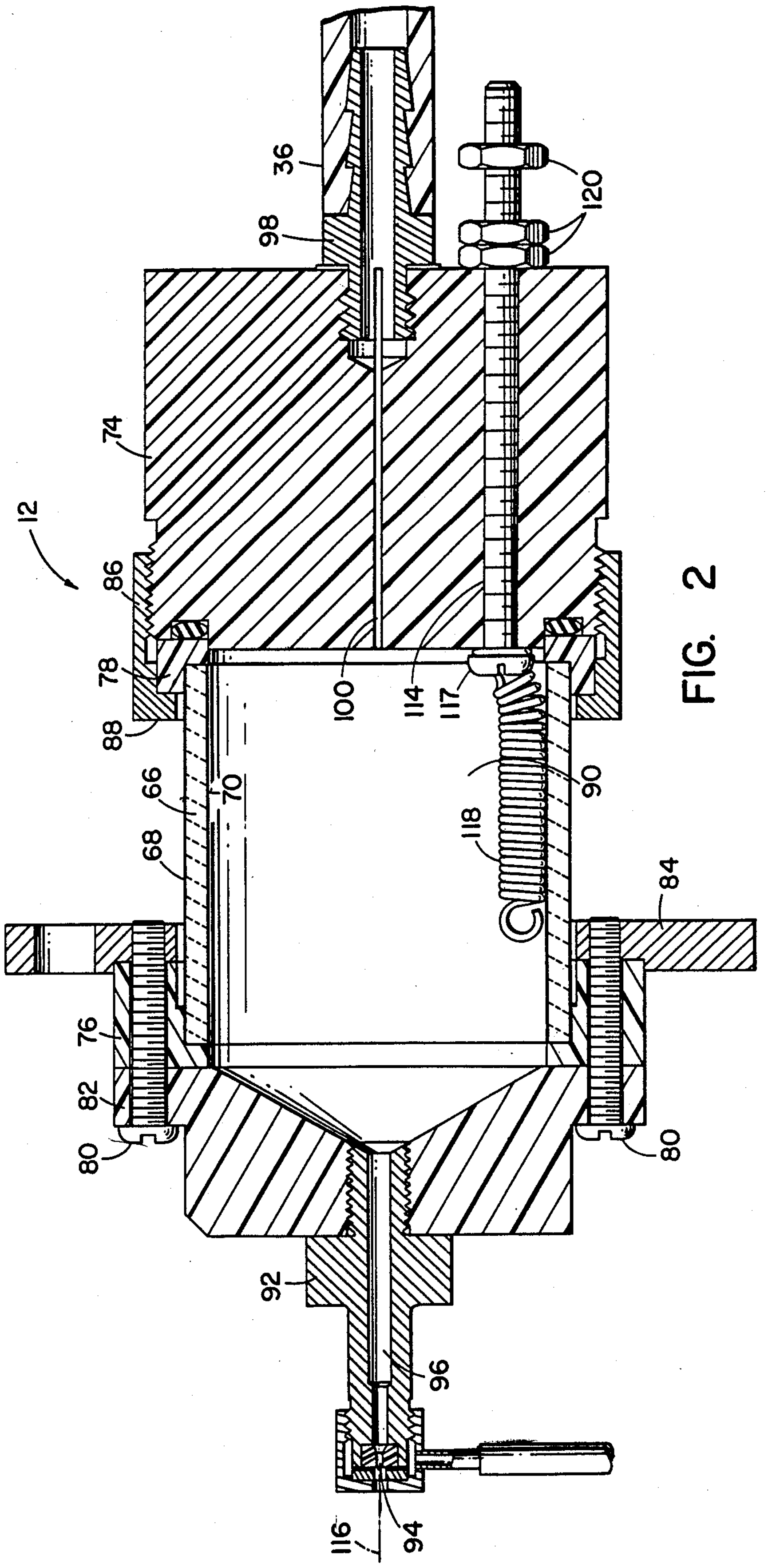
FIG. 2 is a longitudinal vertical sectional view taken through the ink drop ejecting head of FIG. 1.

Reference may now be made to FIG. 2 for a more detailed description of the ejecting head 12. As shown in this figure the head includes a tubular section 66 of piezoelectric material having an external cylindrical surface 68 and an internal cylindrical surface 70. Actually, the section 66 consists primarily of a body of ceramic piezoelectric material and the surfaces 68 and 70 are each defined by a thin plated layer of electrically conductive metal applied to the ceramic material so that an electric potential can be applied across the surfaces 68 and 70, the ceramic material being of such a nature that when the electric potential across the surfaces 68 and 70 is varied the tubular section 66 will vary in shape, primarily by radially expanding or contracting depending on the direction of change of electric potential, to vary the volume contained between the internal surface 70 of the tubular section.

The open front end of the tubular section 66 is closed by a forward closure member 72 and its rear end is closed by a rear closure member 74. To make connections with these closure members the tubular section 66 has an annular member 76, preferably of epoxy/glass material, bonded to its forward end and also has an annular member 78, also preferably of epoxy/glass material, bonded to its rear end, with both annular members 76 and 78 extending radially outwardly from the external cylindrical surface 68.

The forward closure member is releasably threadably connected with the tubular section 66 of piezoelectric material by a number of screws 80, 80 passing through holes in a flange portion 82 of the closure member 72, through registering openings in the annular member 76 and into threaded engagement with a combined clamping and mounting ring 84. That is, the ring 84 is used to mount the ejecting head to the support 24, as shown in FIG. 1, and is also used to clamp the ring 76 between it and the flange 82, in cooperation with the screws 80, 80, therefore forming a tight but releasable connection between the forward closure member 72 and the tubular section 66.

The rear closure member 74 is releasably connected to the tubular section 66 by means of an annular threaded union member 86 which threadably engages threads on the rear closure member 74 and has a radially inwardly extending shoulder portion 88 engageable with the rear ring 78 of the tubular section 66 to clamp the ring between the shoulder 88 and the rear closure member 74 to provide a tight but releasable connection between the rear closure member and the tubular section 66.

Both the forward closure member 72 and the rear closure member 74 are made of an electrically nonconducting plastic material such as Delrin. The interior of the tubular section 66 as closed by the forward and rear closure members 72 and 74 forms an ink receiving chamber 90. For purposes of clarity the ink is not shown in FIG. 2 but when the ejecting head 12 is in operation the chamber 90 is completely filled with ink 30 from the supply container 28 of FIG. 1.

Figure 4:
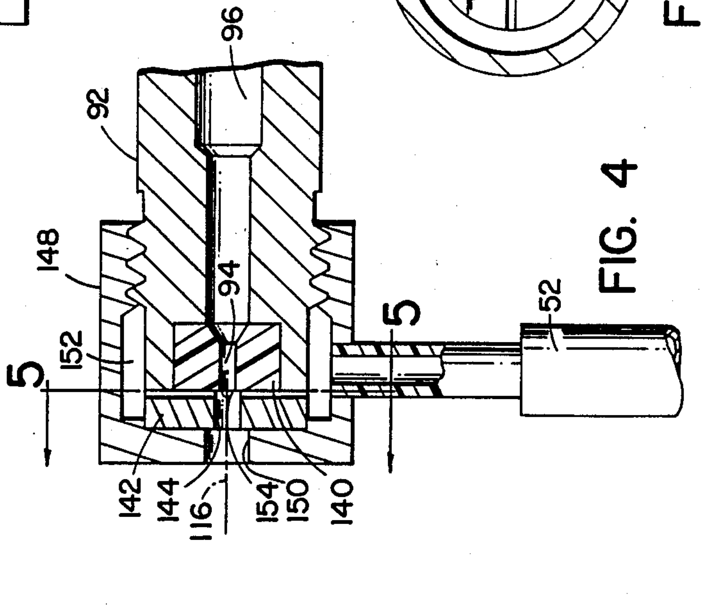
FIG. 4 is an enlarged fragmentary longitudinal vertical sectional view taken through the forward end of the nozzle of the ink drop ejecting head of FIG. 1.

Associated with the forward closure member 72 is a nozzle means providing an ejection port and a passage extending through the forward closure member providing communication between the ejection port and the ink chamber 90. The actual construction of the nozzle means may vary widely, but in the illustrated and preferred case this means includes a separate nozzle member 92, providing an ejection port 94 and a communicating passage 96, threadably connected with the forward closure member 72 as shown in FIG. 4 to permit the nozzle to be readily removed from the member 72 for cleaning or replacement.

The rear closure member 74 has associated with it an inlet means providing an inlet port connectible with the ink supply tube 36 and providing an inlet passage between such port and the ink chamber 90. Again, such inlet means may vary but in the preferred and illustrated case it includes a barbed hose connector 98 threaded into the closure member 74 as shown for receiving the associated end of the tube 36 and also includes a length 100 of metal tube fitted in the closure member 74 and having a bore providing a passage communicating between the hose connector 98 and the ink chamber 90.

To achieve an acceptable ejection of drops from the ejection port 94 a certain balancing of factors influencing such ejection has to be made with such factors including the impedance offered by the outlet passage 96; the impedance offered by the inlet passage or tube 100; the impedance offered by the filter 34; the elasticity of the supply tubes 32, 36; the static pressure applied to the ink through the line 52; the viscosity of the ink; the volume of the ink chamber 90; and the change in ink chamber volume effected by one of the actuating pulses 40. As an example, however, in a case where the supply lines 32 and 36 are of nominal quarter inch Tygon tubing, the filter 34 is of the construction shown and a 2 p.s.i. static pressure is applied to the line 52, the tubular section 66 may have an internal diameter of about 0.5 inch to 1.0 inch and a length of about 0.5 inch to 1.0 inch; the ejection port 94 may have a diameter of about 0.004 to 0.012 inch; the bore of the inlet tube 100 or other inlet passage may have a diameter of 0.012 to 0.062 inches; the combined length of the supply tubes 32 and 36 may be 10 to 30 inches; the viscosity of ink 30 may be 65 to 100 centipoise; the filter element 60 may be a 300 mesh filter; the average volume of each ejected drop may be about $1.6\times10^{-6}$ in.$^3$; each voltage pulse 40 may be of a substantially sine shape and have a peak to peak voltage of 200 to 600 volts; and the peak to peak change in volume of the ink chamber 90 effected by each such pulse may be on the order of about $60\times10^{-6}$ in.$^3$.

Referring both to FIG. 1 and FIG. 2, the electrical connection between the terminal 48 and the external surface 68 of the tubular section 66 is provided by a metallic band 110 surrounding the surface 68 and clamped to it by a number of screw and nut pairs 112, 112, one of which also serves as the terminal 48. The connection with the internal surface 70 includes a bolt 114 extending through the rear closure member 74 parallel to the axis 116 of the ejecting head and having a head 117 located in the ink chamber 90. Clamped between the head 117 and the closure member 74 is one end of a helical spring 118 which engages the internal surface 70 and is held in a deflected condition by it. Therefore, the resiliency of the spring holds it in firm engagement with the surface 70 to provide a good electrical contact. At the same time the spring 118 is not fixedly connected to the tubular section 66 and can slide relative to that section when the rear closure member 74 is removed thereby facilitating removal or replacement of the rear closure member relative to the tubular section. The outer end of the bolt 114 extends beyond the rear end of the rear closure member 74 and provides the terminal 46 of FIG. 1. A number of nuts 120 threaded onto the outer end of the bolt hold the bolt in place relative to the closure member 74 as well as serve to hold the conductor 42 to the bolt.

Figure 6:
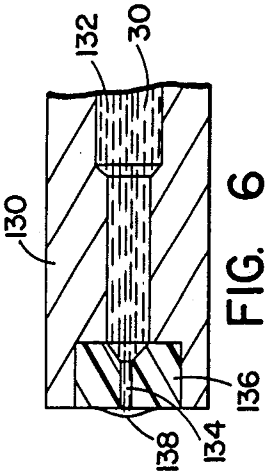
FIG. 6 is a view similar to FIG. 4 but showing a nozzle not including the blob reducing or eliminating means of FIG. 4.

FIG. 6 shows the forward end of a nozzle 130 which may be used with an ink drop ejecting head otherwise identical to the head 12 of FIGS. 1 and 2 except for the nozzle 130 replacing the nozzle 92. The nozzle 130 is similar to the nozzle 92 except for not including any means for reducing or eliminating a blob of ink which may cover the ejection port at some times during the operation of the ejecting head. As illustrated in FIG. 6 the nozzle 130 includes an outlet passage 132 terminating in an ejection port 134 formed by an insert 136 preferably made of glass or a natural or synthetic gemstone such as ruby or sapphire. The insert 136 may in fact be a jewel bearing such as often used in watches. Since the ink in the associated ink chamber 90 has a positive static pressure applied to it, if the head is actuated at a low frequency, that is, if the period between successive actuations is relatively long, ink 30 will tend to ooze outwardly through the port 132 to form an ink blob 138 covering the port. Therefore, when a blob such as the one illustrated at 138 is present the next ink drop ejected through the port 134 will have to shoot through the blob, and this will slow down its velocity, and perhaps change its shape and produce small satellite drops, as compared to the velocity and other characteristics of the ejected drop produced when the blob 138 is not present.

Figure 5:
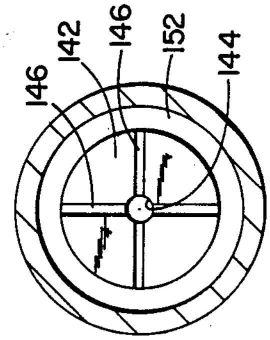
FIG. 5 is a transverse sectional view taken on the line 5—5 of FIG. 4.

Therefore to avoid the influence of a blob, such as the one shown at 138 in FIG. 6, and the fact that such blob may or may not be present or may be of different sizes depending on the frequency of actuation, the ejecting head 12 of FIGS. 1 and 2 includes a means for eliminating or reducing such blob. Referring to FIGS. 4 and 5 the nozzle 92, similarly to that of FIG. 6 has an inset 140, preferably of glass or synthetic or natural gemstone, providing the ejection port 94. The means for eliminating or reducing a blob covering the ejection port 94 includes an annular member 142 engaging the end face of the nozzle 92 and having a central opening 144 of slightly large diameter than the port 94 and having its axis colinear with the axis 116 of the port 94. A number of radially extending grooves 146, 146 are formed on the inner face of the annular member 142 each extending from the central opening 144 to the outer circumference of the member 142. The annular member 142 is held in place on the nozzle 92 by an annular nut 148 having a central opening 150 substantially larger than the opening 144 of the member 142. The nut 148 in combination with the nozzle 92 also defines an annular vacuum chamber 152 surrounding the annular member 142. Therefore each groove 146 in the annular member 142 at its radially inward end defines a sucker port 154 located close to the ejection port 194 communicating with the vacuum chamber 152 through a passage defined by the associated groove 146. As previously mentioned, the vacuum chamber is connected to a vacuum drain through a tube 52 which applies a slight vacuum to the vacuum chamber 152 thereby causing any ink tending to form a blob to be withdrawn through the sucker ports 154, 154 through the passages defined by the grooves 146 to the vacuum chamber 154 and from there to the vacuum drain through the tube 52.

Figure 7:
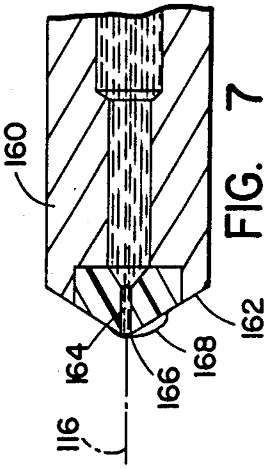
FIG. 7 is a view similar to FIG. 4 but showing the nozzle of an ink drop ejecting head comprising another embodiment of the present invention.

FIG. 7 shows another nozzle 160 which may be substituted for the nozzle 92 having an alternative means for reducing the thickness of a blob covering the ejection port. In this case the blob reducing means consists of a conical surface 162 on the forward end of the nozzle which intersects the ejection port 164 at a relatively sharp edge 166 with the conical surface 162 extending rearwardly from the sharp edge 166. Therefore, when the nozzle 160 is positioned with its axis 116 generally horizontal, as shown in FIG. 7, an ink blob 168 which may form over the port 164 because of the influence of gravity and the rearward inclination of the conical surface 162 will take on a shape substantially as shown in FIG. 7 wherein the bulk of the blob will be located below the lower portion of the port 166 leaving only a relatively thin, and generally acceptable, layer of ink covering the port 164.

Figure 8:
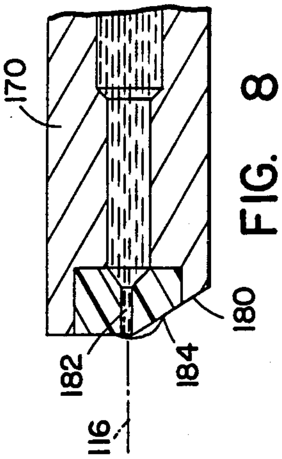
FIG. 8 is a view similar to FIG. 4 but showing a nozzle of an ink drop ejecting head comprising still another embodiment of the present invention.
Figure 9:
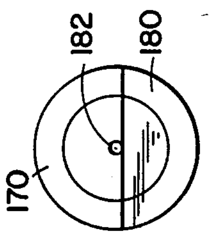
FIG. 9 is a front elevational view of the nozzle of FIG. 8.

FIGS. 8 and 9 show a nozzle 170 having an ink blob reducing means slightly different from that of FIG. 7 but operating on substantially the same principle. In this case the nozzle 170 has a planar inclined surface 180 which intersects the lower portion of the ejection port 182 and inclines rearwardly and downwardly from such port 182 when the nozzle is positioned with its ejection port axis 116 generally horizontal as shown in FIG. 8. Therefore again when a blob 184 does tend to appear at the port 182 it will because of gravity and the inclination of the surface 180 tend to take the illustrated shape of FIG. 8 wherein a major portion of the blob is located below the port 182 leaving only a thin and acceptable layer of ink covering the port.

Figure 11:
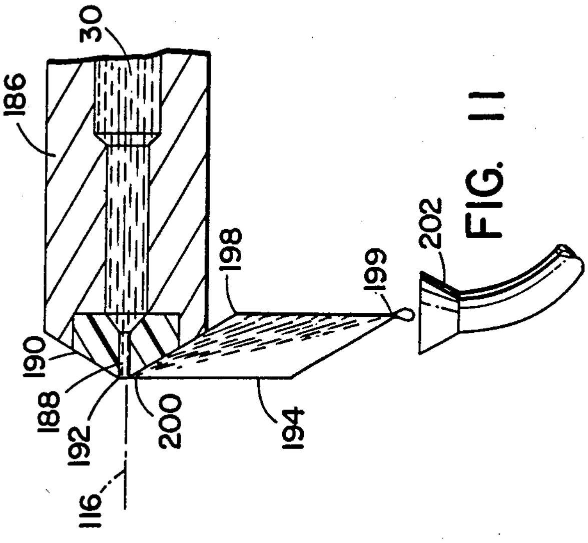
FIG. 11 is a longitudinal vertical fragmentary sectional view taken on the line 11—11 of FIG. 10.
Figure 10:
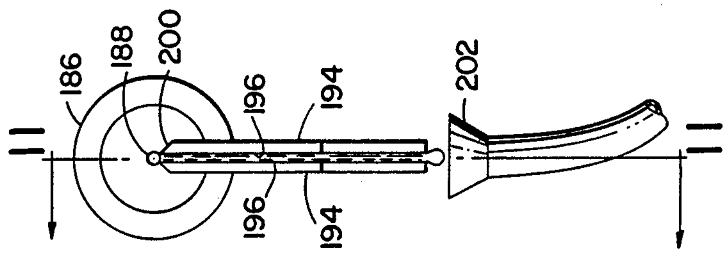
FIG. 10 is a front elevational view of a nozzle used with an ink drop ejecting head comprising still another embodiment of the present invention.

The means for eliminating or reducing the blob of ink which may appear over the ejection port may also be one wherein the ink of the blob is drawn from the vicinity of the ejection port by capillary action. As an example one such means is shown in FIGS. 10 and 11 where the illustrated nozzle 186 has an ejection port 188 and a rearwardly extending conical surface 190 having an axis colinear with the axis 116 of the port 188 and intersecting the port at a relatively sharp edge 192. A pair of blades 194, 194, supported from the nozzle by means not shown, are arranged so as to have opposed parallel faces 196, 196 closely spaced relative to one another. Further, the blades are each shaped as shown in FIG. 11 so as to have an inclined upper edge 198 engaging the conical surface 190 and terminating in an upper point 200 located very close to the ejection port 188. Therefore, as ink 30 oozes from the port 188 it will be attracted by capillary action to the space between the blades 194, 194 and will thereby be withdrawn from the region of the ejection port 188 to prevent the build up of a blob. The two blades 194, 194 are further designed so that the ink collected between their opposed surfaces 196, 196 will flow to a lower end 199 from which it can drop into a suitable drain 202.

I claim:

1. An ink drop ejecting head for an ink jet printing system, said head comprising a tubular section of piezoelectric material having internal and external cylindrical surfaces and which expands and contracts to vary its internal volume in response to changes in the electrical potential appearing across said internal and external surfaces, said tubular section having open forward and rear ends, a forward closure member connected to said tubular section and closing its forward end, a rear closure member connected to said tubular section and closing its rear end, the interior of said tubular member as closed by said front and rear closure members providing an ink chamber for containing ink to be ejected, nozzle means associated with said forward closure member forming an ejection port and an outlet passage extending through said forward closure member between said ink chamber and said ejection port, inlet means associated with said rear closure member and providing an inlet port and an inlet passage extending through said rear closure member between said inlet port and said ink chamber, said forward closure member being connected to said tubular section by releasable connecting means and said rear closure member also being connected to said tubular section by releasable connecting means whereby said forward and rear closure members may both be disassembled from said tubular section, said means for releasably connecting said forward closure member to said tubular section including a forward annular ring bonded to said tubular section, said annular ring being located adjacent the forward end of said tubular section and extending radially outwardly from said external surface of said tubular section, and threaded connecting means engageable with said forward annular ring and said forward closure member for threadably holding said forward annular ring and said forward closure member in connected relationship, and said means for releasably connecting said rear closure member to said tubular section including a rear annular ring bonded to said tubular section, said rear annular ring being located adjacent the rear end of said tubular section and extending radially outwardly from said external surface of said tubular section, and threaded connecting means engageable with said rear annular ring and said rear closure member for threadably holding said rear annular ring and said rear closure member in connected relationship.

2. An ink drop ejecting head for an ink jet printing system said head comprising a tubular section of piezoelectric material having internal and external cylindrical surfaces and which expands and contracts to vary its internal volume in response to changes in the electrical potential appearing across said internal and external surfaces, said tubular section having open forward and rear ends, a forward closure member connected to said tubular section and closing its forward end, a rear closure member connected to said tubular section and closing its rear end, the interior of said tubular member as closed by said front and rear closure members providing an ink chamber for containing ink to be ejected, nozzle means associated with said forward closure member forming an ejection port and an outlet passage extending through said forward closure member between said ink chamber and said ejection port, inlet means associated with said rear closure member and providing an inlet port and an inlet passage extending through said rear closure member between said inlet port and said ink chamber, said forward closure member being connected to said tubular section by releasable connecting means and said rear closure member also being connected to said tubular section by releasable connecting means whereby said forward and rear closure members may both be disassembled from said tubular section, said forward closure member and said rear closure member each being made of an electrically nonconductive plastic material, said tubular section having an electrically conductive plated layer forming its external cylindrical surface and another electrically conductive plated layer forming its internal cylindrical surface, two electric terminal means each contacting a respective one of said plated layers for applying said electrical potential across said internal and external surfaces of said tubular section, said terminal means for said internal surface comprising a bolt extending through one of said closure members generally parallel to the axis of said tubular section, said bolt having a head positioned in said ink chamber and an outer end portion extending outwardly beyond the associated closure member, and a spring having one end clamped between said head of said bolt and said associated closure member, said spring extending from said bolt head into engagement with said internal surface of said tubular section which tubular section holds said spring in a deflected condition so that its resiliency presses it against said internal surface of said tubular section to make electrical contact therewith.

3. An ink drop ejecting head for an ink jet printing system, said head comprising a tubular section of piezoelectric material having internal and external cylindrical surfaces and expands and contracts to vary its internal volume in response to changes in the electrical potential appearing across said internal and external surfaces, said tubular section having open forward and rear ends, a forward closure member connected to said tubular section and closing its forward end, a rear closure member connected to said tubular section and closing its rear end, the interior of said tubular member as closed by said front and rear closure members providing an ink chamber for containing ink to be ejected, nozzle means associated with said forward closure member forming an ejection port and an outlet passage extending through said forward closure member between said ink chamber and said ejection port, inlet means associated with said rear closure member and providing an inlet port and an inlet passage extending through said rear closure member between said inlet port and said ink chamber, said forward closure member being connected to said tubular section by releasable connecting means and said rear closure member also being connected to said tubular section by releasable connecting means whereby said forward and rear closure members may both be disassembled from and later reassembled with said tubular section, and means for applying a static pressure to ink contained in said ink chamber with the result that when the period between successive actuations of said head exceeds some value a blob of ink will form externally over said ejection port, and means for reducing the thickness of such a blob as measured axially of the path of ejection of a drop of ink from said head, said means for reducing the thickness of said blob being a capillary means located externally of and immediately adjacent said ejection port for engaging the material of a blob which forms over said ejection port and for conducting such material away from said port by capillary action, said capillary means including a pair of blades having opposed surfaces closely spaced from one another, said blades each having one end positioned adjacent said ejection port and extending away from said one end in a direction generally radially of said ejection port.

4. An ink drop ejecting head for an ink jet printing system, said head comprising means defining an ejection port, means defining an ink chamber for containing ink to be ejected which chamber is in communication with said ejection port, means for repeatedly causing the volume of said ink chamber to undergo a cyclic change to eject a drop of ink from said ejection port with each cyclic change, and means for reducing the thickness of a blob of ink which may form externally over said ejection port between successive ones of said cyclic changes of ink chamber volume, said means for reducing the thickness of said blob being a capillary means located externally of and immediately adjacent said ejection port for engaging the material of a blob which forms over said ejection port and for conducting such material away from said port by capillary action, said capillary means including a pair of blades having opposed surfaces closely spaced from one another, said blades each having one end positioned adjacent said ejection port and extending away from said one end in a direction generally radially of said ejection port.

* * * * *